Dec. 3, 1946.   F. H. OWENS   2,411,890
PROGRAM PRESELECTING AND CONTROL APPARATUS
Filed July 10, 1942   8 Sheets-Sheet 1

INVENTOR
FREEMAN H. OWENS
BY
ATTORNEY

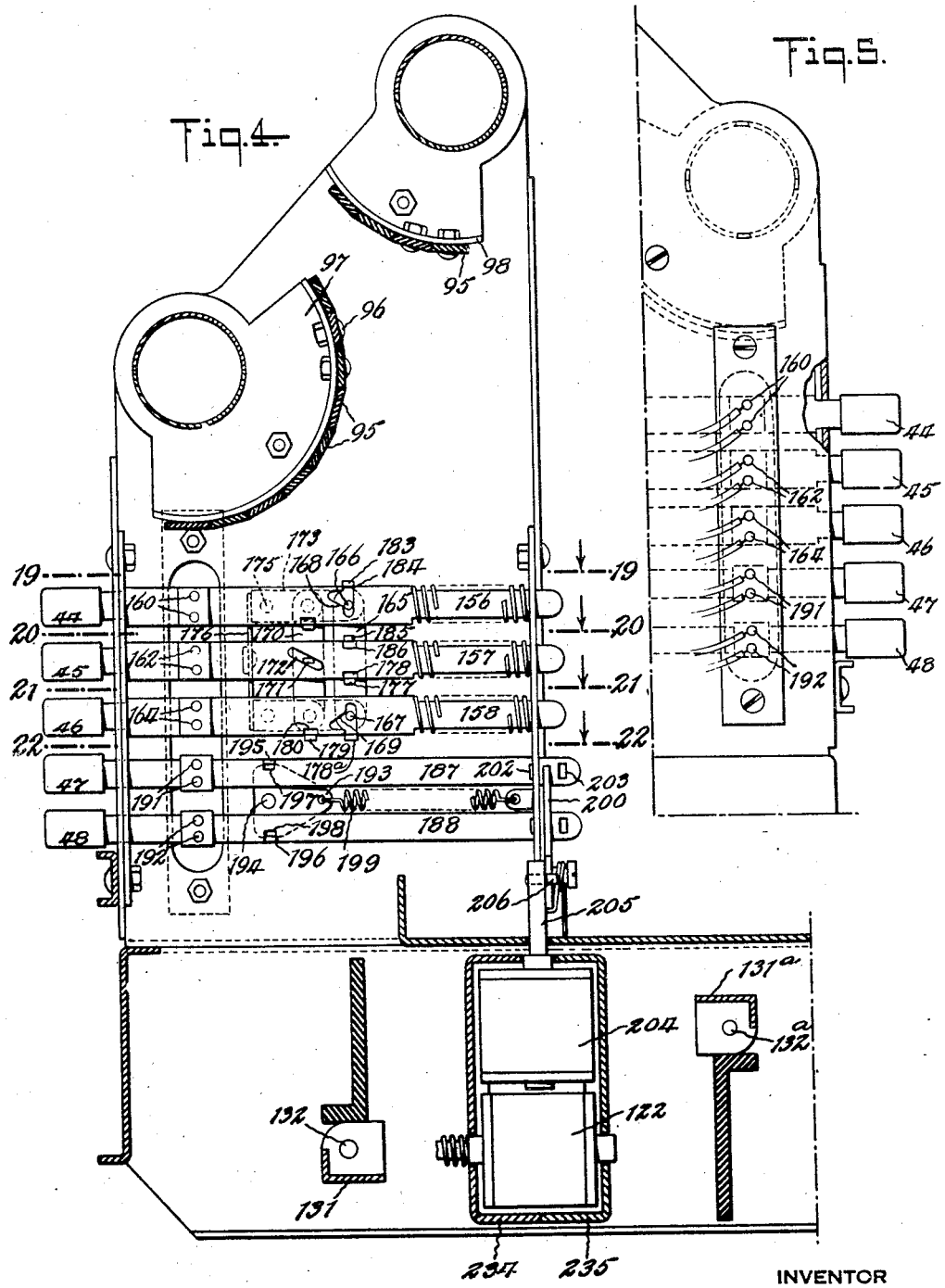

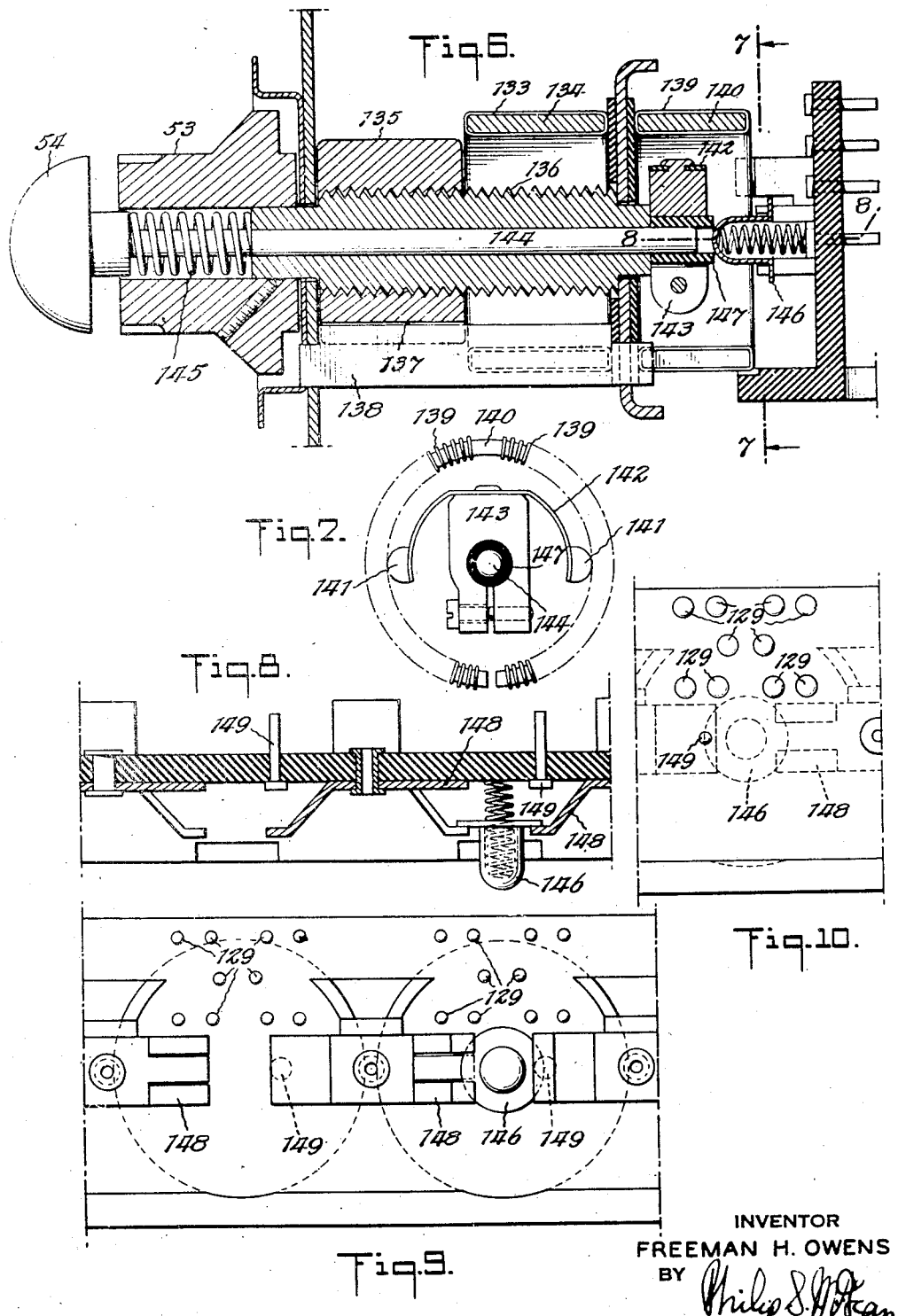

Dec. 3, 1946.  F. H. OWENS  2,411,890
PROGRAM PRESELECTING AND CONTROL APPARATUS
Filed July 10, 1942   8 Sheets-Sheet 6
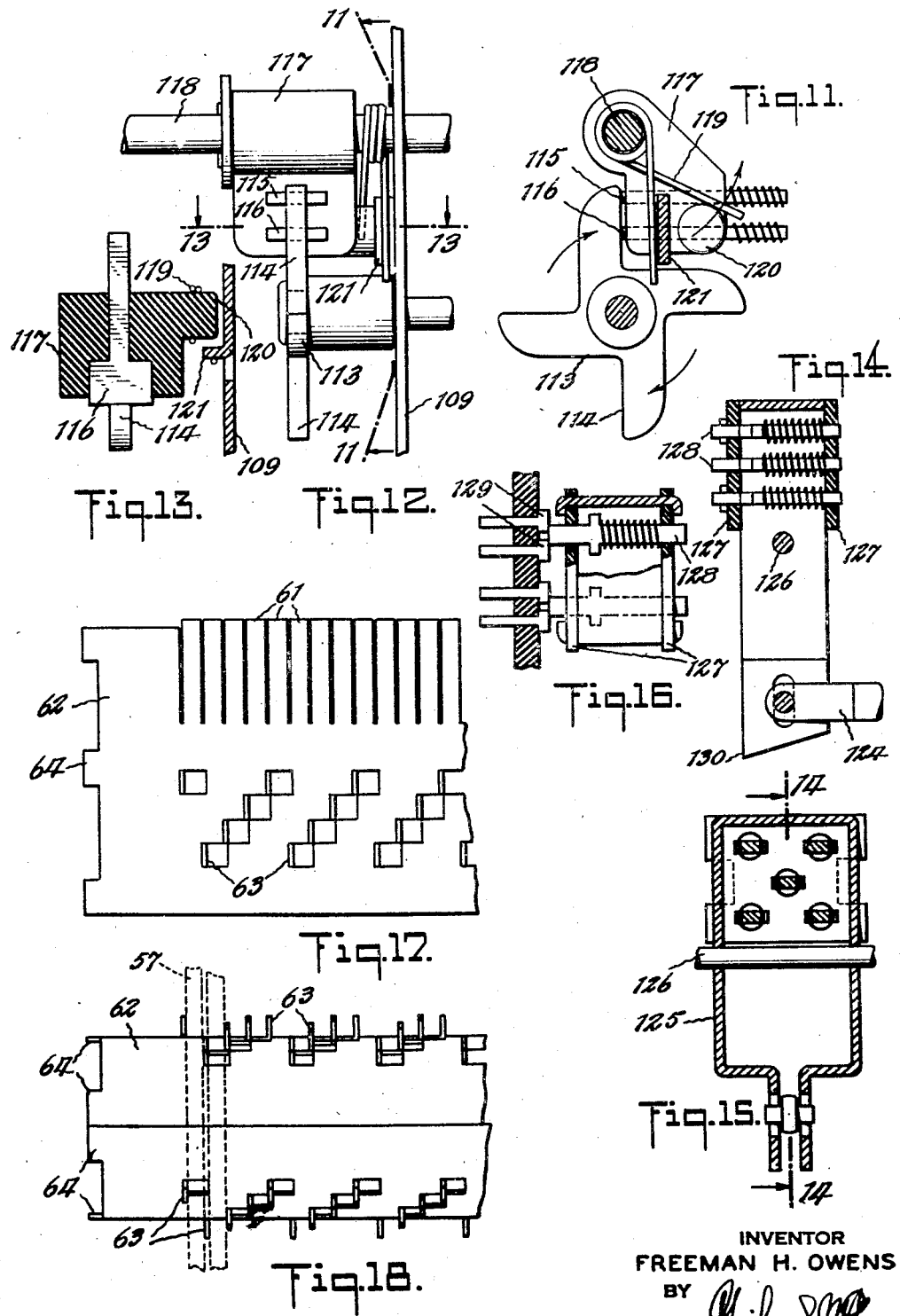
INVENTOR
FREEMAN H. OWENS
BY
ATTORNEY

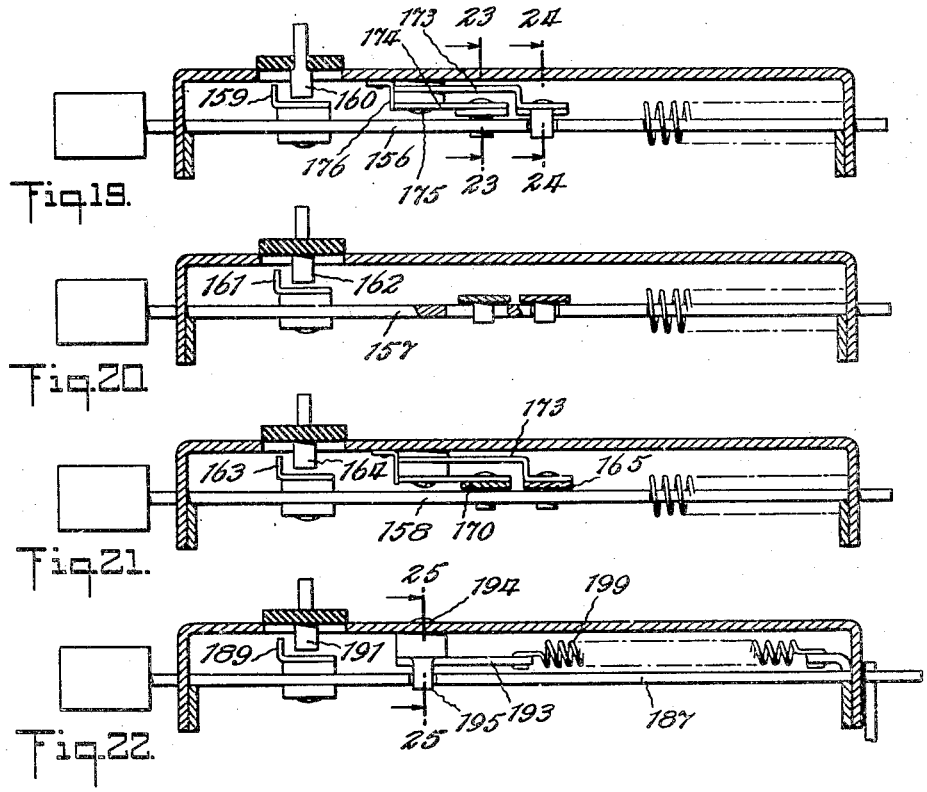
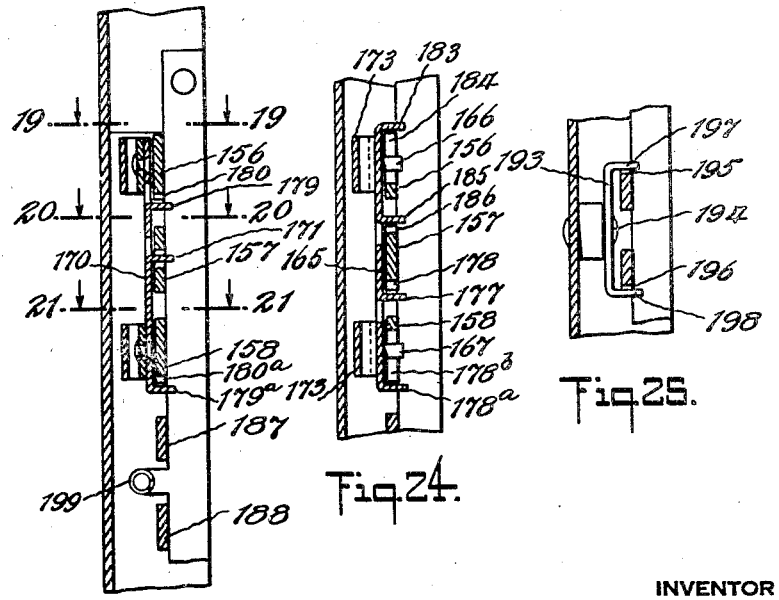

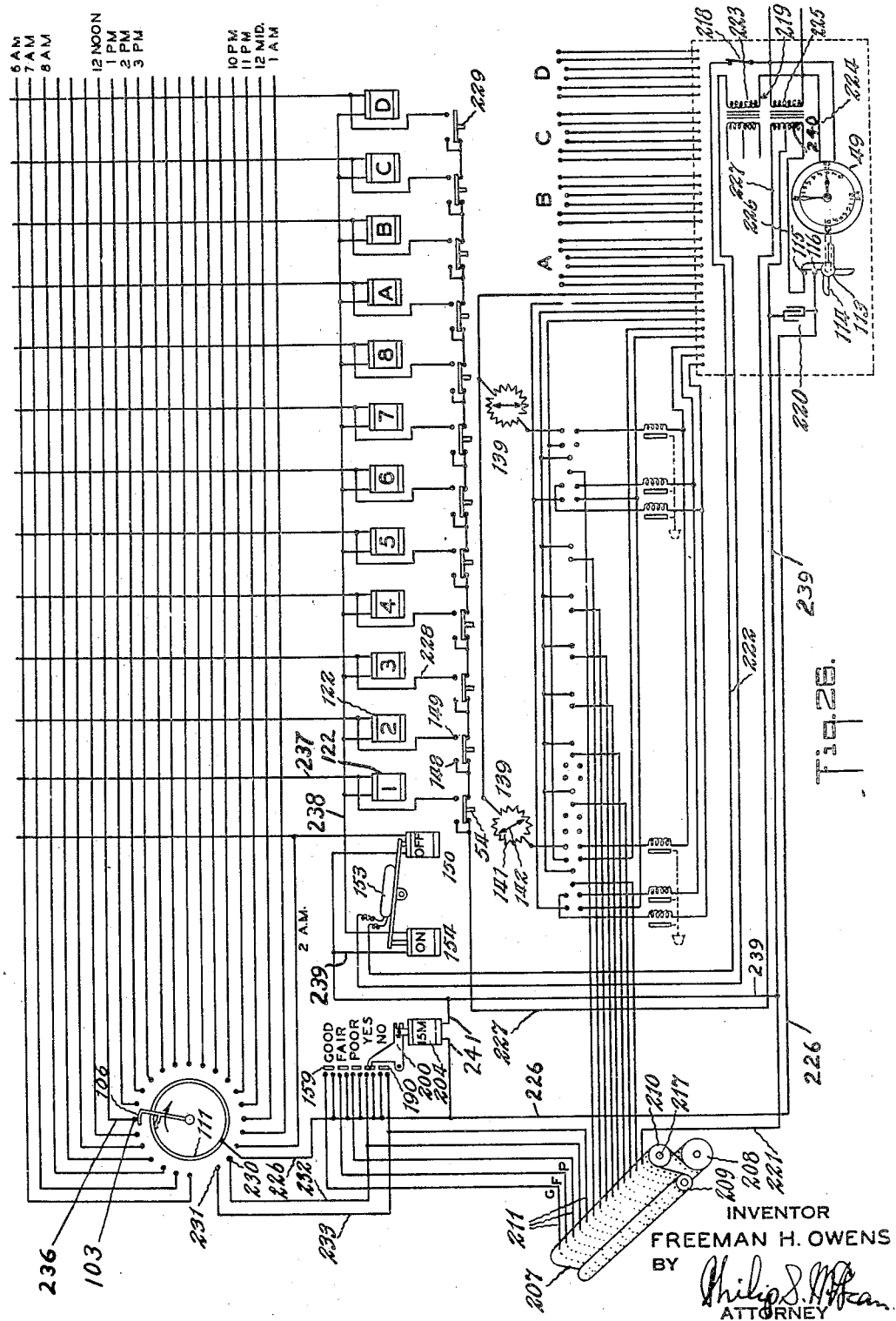

Patented Dec. 3, 1946

2,411,890

UNITED STATES PATENT OFFICE 2,411,890

PROGRAM PRESELECTING AND CONTROL APPARATUS

Freeman H. Owens, New York, N. Y.

Application July 10, 1942, Serial No. 450,449

6 Claims. (Cl. 161—1)

The invention here disclosed relates to apparatus for preselecting desired programs or sequences and is a continuation in part of the invention disclosed in co-pending patent application Ser. 397,504, filed June 10, 1941, Patent No. 2,337,568, issued December 28, 1943.

Special objects of this invention are to simplify and improve the program selecting and control mechanism, to construct it so far as possible of inexpensive duplicate parts, readily manufactured and easily assembled and to provide in a small unit a wide range of program coverage.

Other, more specific objects are to provide a program control unit which will enable a user to express an opinion of the program received or to express individual preference as by voting on questions submitted or then before the public; which will be capable of having its range of selection extended, if desired, to cover other than the usual or normal programs, for example, into the short wave, frequency modulation and other wave bands other than the usual broadcast stations; which will be accurate and reliable in its timing and which can be readily set for such operations as tuning and volume control.

Other desirable objects will appear as the specification proceeds.

The novel features and combinations through which the purposes of the invention are attained are set forth in the following specification, broadly covered in the claims and illustrated by way of practical example in the accompanying drawings. It is realized however, that actual physical structure may be modified and changed in various ways all within the true spirit and broad scope of the invention. The illustration therefore is to be considered primarily for purposes of disclosure and not by way of limitation, the actual scope of the invention being as hereinafter broadly defined and claimed.

Fig. 2a is a sectional continuation of parts at the top of Fig. 2.

Fig. 4 is a broken sectional view substantially on the line 4—4 of Fig. 1.

Fig. 5 is a broken end elevation partly in section.

Fig. 6 is a further enlarged sectional detail of one of the tuning, volume controlling and switch units.

Fig. 7 is a part sectional detail of one of the volume controls, this view taken on substantially the plane of line 7—7 of Fig. 6.

Fig. 8 is a horizontal sectional detail of the manual switches, on substantially the plane of line 8—8 of Fig. 6.

Fig. 9 is a front elevation of switch parts shown in Fig. 8.

Fig. 10 is a broken face view of the switch contacts.

Fig. 11 is an enlarged detail of the timing switch, parts appearing in section as on line 11—11 of Fig. 12.

Fig. 12 is a broken side view of the time switch.

Fig. 13 is a broken sectional detail as on line 13—13 of Fig. 12.

Figs. 14, 15, 16 are broken sectional details of one of the gang switch units for controlling a set of radio circuits or the like.

Fig. 17 is a broken plan of one of the blanks from which the key supports are made.

Fig. 18 is a broken side view showing how the two parts or halves of the key support are assembled.

Figs. 19, 20, 21, 22 are enlarged horizontal sectional views of the opinion recording or voting key mechanisms as on lines 19—19, 20—20, 21—21 and 22—22 of Fig. 4.

Figs. 23, 24 and 25 are broken sectional details as on the corresponding lines of Figs. 19 and 22.

Fig. 26 is a wiring diagram.

Figure 1:
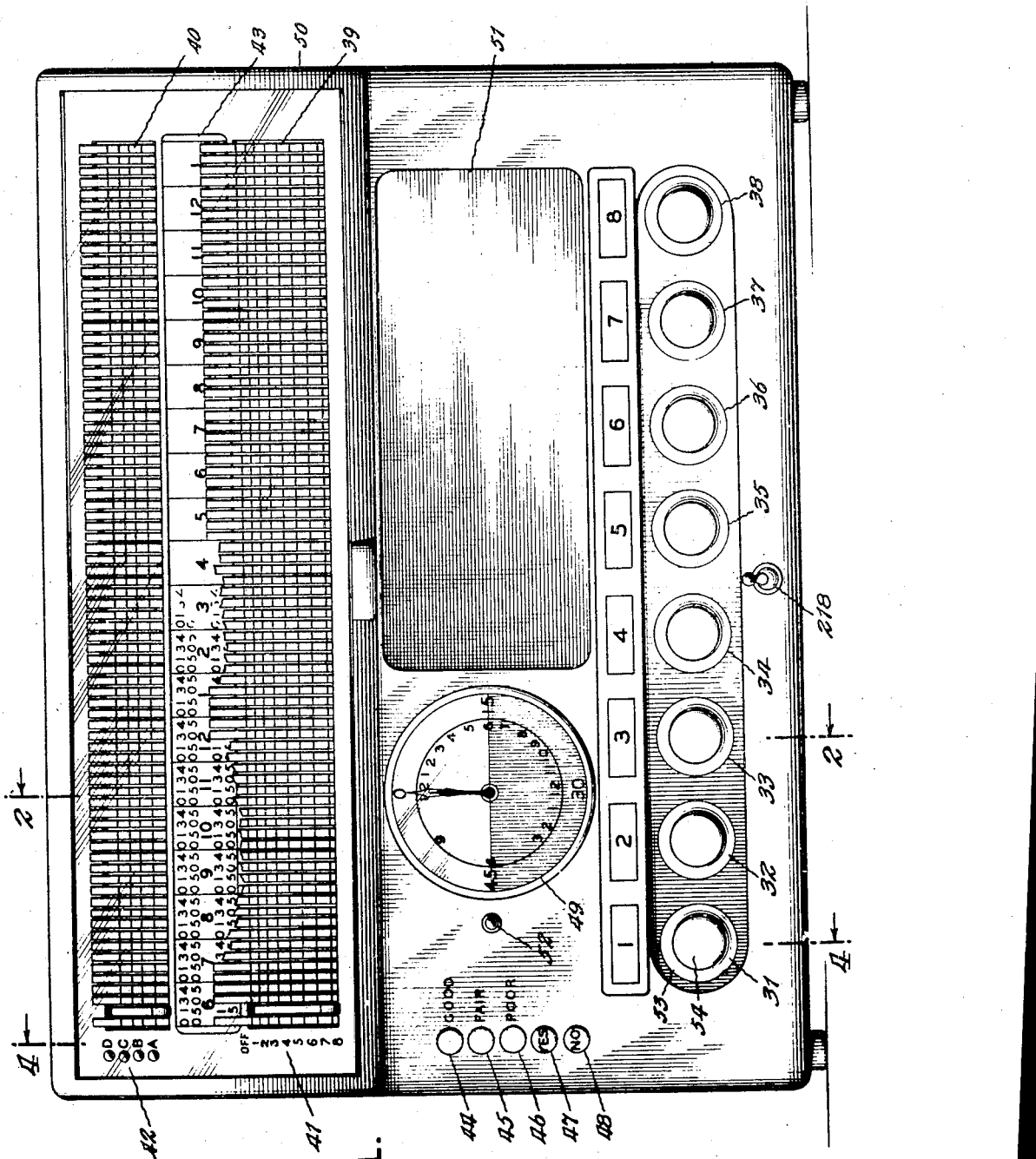
Fig. 1 is a front elevation of a preferred embodiment of the invention, portions of the keys in the lower bank being broken away to show time indications behind the same.

The embodiment of the invention illustrated in Fig. 1 is designed to provide time-selected, tuned and volume-controlled reception from eight different radio stations, opinion and vote recording as to programs or other matters and extension of program selection to other wave bands or frequencies, such as short wave, amateur, frequency modulation and television.

The manual controls for the eight stations, which might be eight different broadcast stations, or say six broadcast stations and two other sets of frequencies such as short wave or amateur, are designated 31, 32, 33, 34, 35, 36, 37, 38.

A bank of rotatable keys 39 provide the means for selecting the station or frequency which will be brought in at any particular time and a second bank of keys 40 provides control by which the radius of action may be extended, for example, to bring in other or different frequencies at any selected time.

In the illustration there are eighty selector keys in each group, one for each 15 minute broadcast period for the twenty hours running from 6 o'clock in the morning until 2 o'clock at night, but there may be keys for the full twenty-four hours or for lesser periods. These keys are shiftable rotatably into different positions corresponding to different broadcast stations or wave band frequencies.

A broadcast station indicating scale 41, is associated with the first bank of keys and similarly, an extra wave band selecting scale 42, is associated with the keys of the second group. A time interval scale 43, is shown in between the two banks where it can be read on either and both sets of keys.

Buttons for registering opinion and which may be designated. for instance, as "good," "fair" and "poor" are indicated at 44, 45, 46, and below those, "yes" and "no" buttons 47, 48, for voting on questions submitted by radio or otherwise.

A twenty-four hour day and night clock 49, is shown on the front of the instrument case 50, alongside the speaker opening 51, said clock having a suitable setting button 52.

The manuals are indicated as consisting in each instance of a back knob 53, for tuning and a concentric front knob 54, which can be turned for volume control or operated as a push button to close circuits for the station selected by the tuning of that particular unit.

The selector keys are shown protected by a transparent cover 55 which if desired. may have a lock thus to prevent accidental shifting or tampering with the selector keys.

Figure 2:
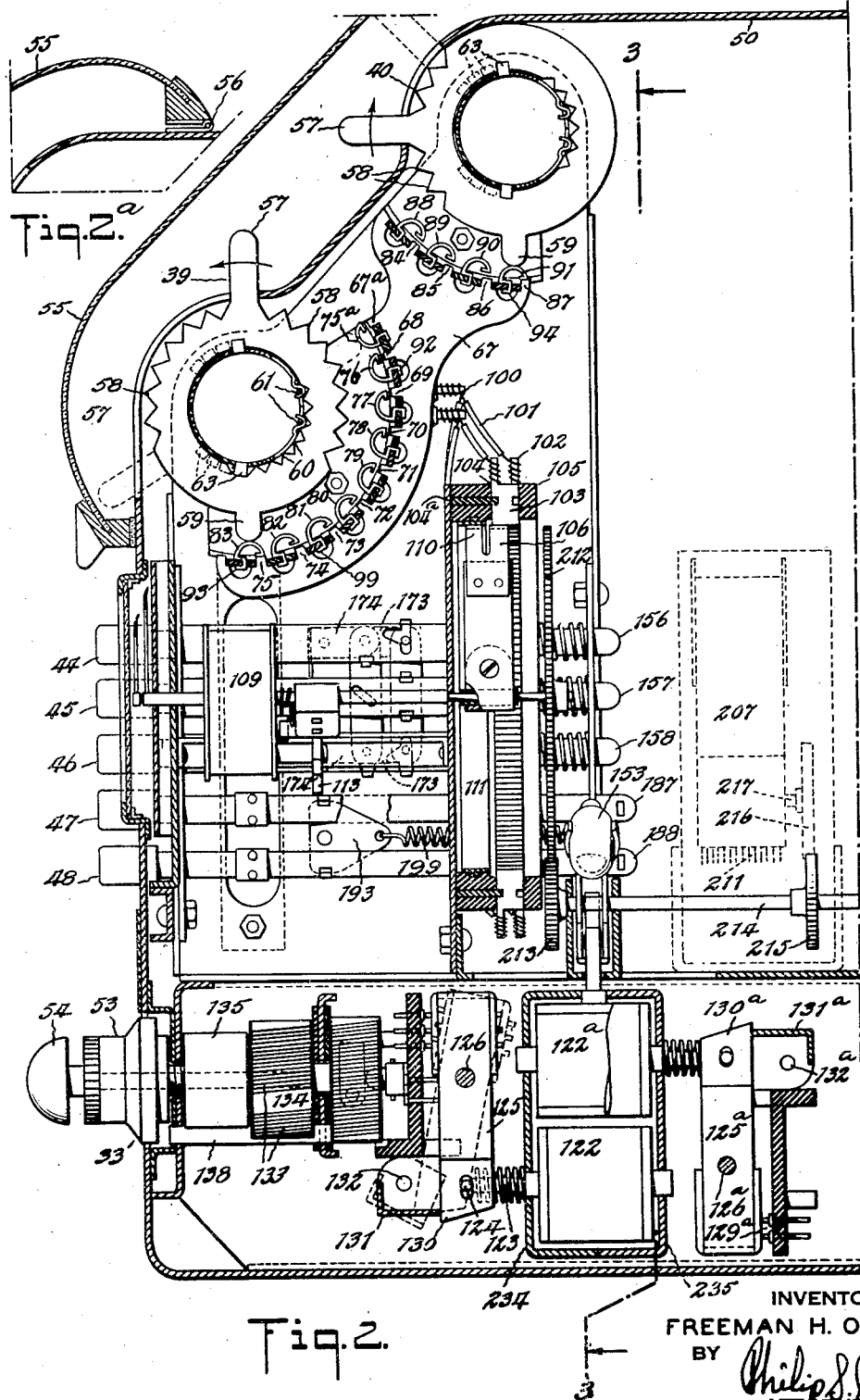
Fig. 2 is an enlarged vertical sectional view on substantially the plane of line 2—2 of Fig. 1

Figs. 2, 2a show the cover hingedly connected with the case at the top, at 56.

In these views, the keys of both sets are shown as rotatably supported flat discs having projecting fingerholds 57, circumferential teeth 58, switch key actuating lugs 59, and, at the inside, retainer teeth 60, for holding engagement by spring detents 61.

The supports for the keys are shown as consisting in each instance of a pair of strips 62, of sheet material having the spring detents 61, cut in the form of a comb, Fig. 17, and bent into semi-circular form Fig. 18, so that the lugs 63, partially severed and bent out therefrom will serve as spacers between the key discs.

These parts are easily assembled by slipping one of the halves 62, of the support into position within a stack of the keys and then after registering the spacer lugs 63, between adjoining key discs, partially collapsing and inserting the other half of the support into position, and then after the lugs 63 of the same are registered with the spaces between the key discs, permitting it to spring back into semi-circular form and locating it in immediately opposed relation to the first half section, in the relation shown in Fig. 2. When the assembly is thus completed, the full bank of keys can be mounted by passing the lugs 64, on the ends of the supports through appropriate mounting slots 65, Fig. 3, in the end plates 66, of the frame or chassis.

Figure 3:
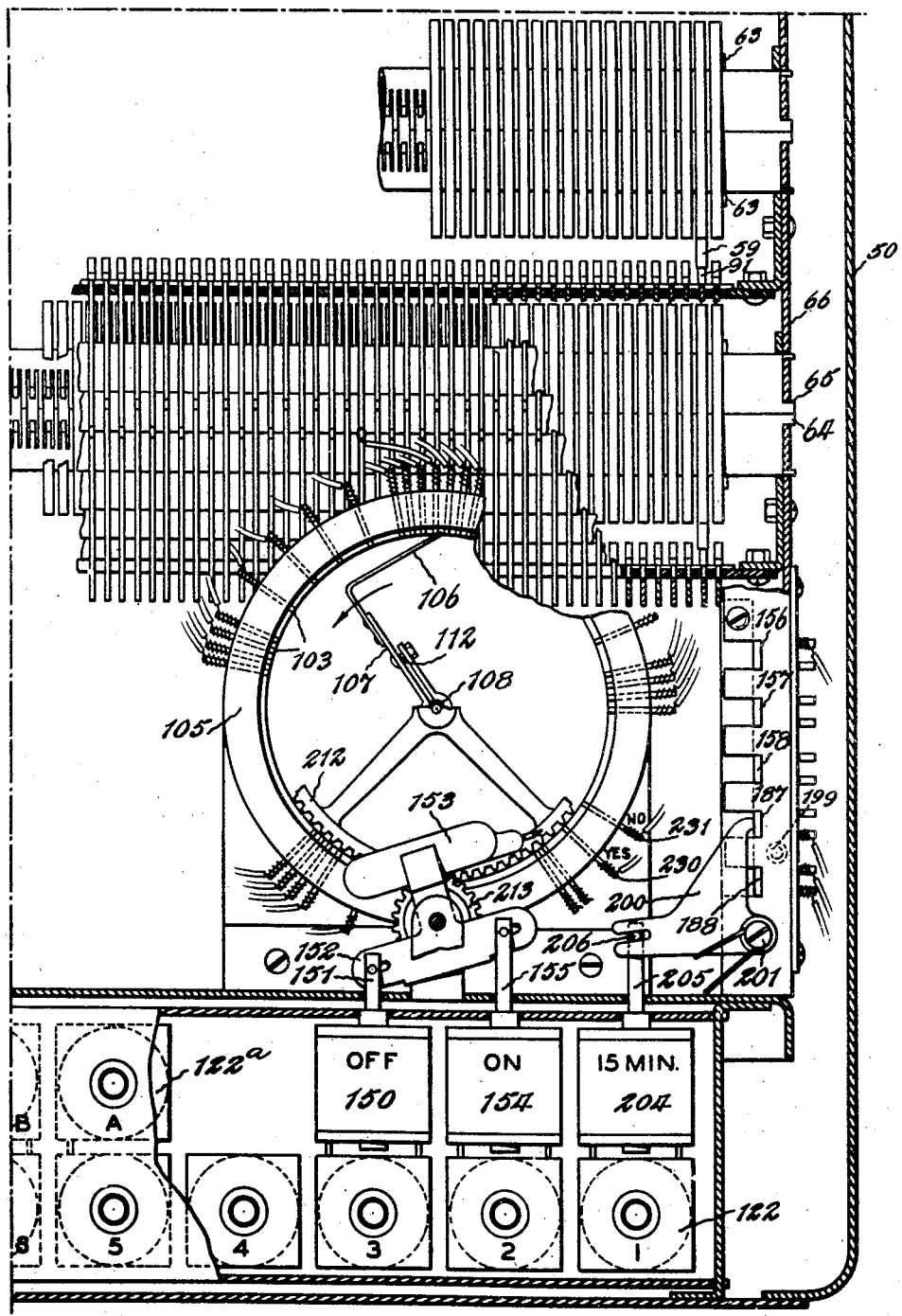
Fig. 3 is a broken longitudinal sectional view on substantially the plane of line 3—3 of Fig. 2.

The station and wave band selecting switches are shown in Figs. 2, 3 and 4, as consisting of segments 67, one for each time interval, located directly in line with the time keys and having one arcuate series of spaced forwardly projecting contact lugs 67a, 68, 69, 70, 71, 72, 73, 74, 75, engageable by the contact fingers 75a, 76, 77, 78, 79, 80, 81, 82, 83, and a second arcuate series of upwardly projecting contact lugs 84, 85, 86, 87, engageable by spring fingers 88, 89, 90, 91. The spring fingers 75a, 76, etc., of the first set may be formed as comb extensions on longitudinally extending bus bars designated 92, and individual to different stations, except for the last bus bar at the bottom Fig. 2, designated 93, and providing an "off" contact. Similarly, the extra wave band switch fingers 88, etc., are shown as connected with and forming parts of bus bars 94, for these particular wave bands.

Fig. 4 shows in particular how these switch parts may be supported in insulated relation by providing strips 95, of insulating material secured at 96, on the arcuate end supports 97, 98, with the contact lugs 67a, 68—75 and 84—87 projecting through notches in the edges of these insulating strips and the station or wave band buses 92, 93 and 94, disposed over the outer faces of said strips and having securing portions 99, Fig. 2, anchored through appropriately located slots or openings in such strips.

The time segments 67 are shown in Figs. 2 and 3 as having terminals 100 connected by wires 101 with terminal portions 102 of the time switch contacts 103 entered through radial slots 104 and held by a locking ring 104a in a circular insulating support 105 in position for successive engagement by a spring brush 106 carried by arm 107, adjustably secured on shaft 108.

The shaft 108, rotates once every twenty-four hours and as indicated in Fig. 2, may be a rearward extension of the hour hand shaft of the clock and which latter is shown in this view as actuated by a synchronous clock motor 109. The spring brush 106, is shown in Fig. 2, as having a branch 110, in wiping engagement with a current supply ring 111.

The hour shaft 108, rotates continuously so as to cause the brush 106, to slide over the time segments 103, and the brush is fixed on the shaft, by means of the adjustable clamp 112, so that it will snap from one segment to the next at an intermediate point in the broadcast period, that is, make engagement with the contact for a succeeding period before the preceding period is completed, thus to set up the next time circuit in readiness to be closed at the instant of change from one period to another.

The closing of the time circuit is effected by an accurately operating "timer" in the form of a star wheel 113, operated from the motor 109, and having one or more arms 114, adapted to bridge the spaced insulated contacts 115, 116, Figs. 11, 12, at a definite instant in each revolution of said wheel. In the illustration, this wheel rotates once per hour and has four equidistantly spaced arms, thus to close the time circuit at the beginning of each fifteen minute interval. The contacts 115, 116, are shown mounted in spaced relation one above the other, in a rocker 117, of insulating material pivoted on the center 118, and yieldingly thrust toward the wheel by spring 119. The lug 120, projecting from the side of said rocker engages a lug 121, extended from the back of motor 109, to limit the extent of swinging movement under the thrust of the spring, the rocker being free to swing in the opposite direction far enough for the contact closing arms to pass underneath and clear of the same.

The timer wheel 113, rotates continuously and as shown in Fig. 11, the arms 114, thereof will engage first the lower contact 116, and then, at just one point in the revolution of the wheel, engage contact 115, as well. Immediately after this bridging engagement of the two contacts, the arm 114, thrusting on contact 115, will rock the contact 116, out of engagement with it. The constantly rotating star wheel in connection with the swinging contact carrier thus provides an accurate and reliable means for closing and then instantly breaking the time circuit at the start of each broadcast interval.

The time control circuits closed by the timer last described and the brush 106, include magnetic circuit closers determined by the selector keys 39 and 40. In the illustration, there is a solenoid 122, Figs. 2 and 3, for each of the stations or broadcast bands, having a core 123, connected at 124, with the lower end of a lever 125, pivoted on axis 126, and carrying spaced insulated plates 127, Figs. 14, 15, 16, in which are slidingly mounted spring pressed plungers 128, for bridging engagement with relatively fixed companion contacts 129. The lower ends of these levers are shown as inclined at 130, to slide over and engage behind the edge of a universal latch bar 131, pivoted to rock on a center 132, Fig. 2. Thus the operation of any one of these magnets will effect the rocking of said universal bar to release a previously held circuit closer and to catch and interlock the lever of the actuated circuit closer.

Similar magnets 122a, through levers 125a, close circuits at 129a, for the additional wave bands controlled by the upper set of keys 40.

In the present disclosure, a separate tuner is provided for each station or wave band, leaving it necessary only to close required circuits for each selecting operation, but it is contemplated that a single tuner may be employed and selection accomplished, by adjustment of such a tuner. Also, it is realized that different kinds of tuners may be employed, such as capacity, permeability or inductance.

In the illustration, a permeability or inductance tuner is shown, in the form of one or more windings 133, wrapped longitudinally about an insulating ring 134, of flat material into which a magnetic core 135, is adjustable by means of the tubular screw 136, Fig. 6, on which said core is mounted, said screw being connected with the tuning knob 53, and the core being held against rotation by being slotted at 137, to slide over the longitudinal guide strip 138.

The volume control is shown in Figs. 6 and 7 as a pair of oppositely wound resistance coils 139, on a ring 140, of flat insulating material supported at the back of the tuning coil and engaged at the inside by rubbing contacts 141, carried by the spring arch 142, on a split block 143, adjustably clamped on the spindle 144, carrying the center knob 54. A spring 145, is shown in Fig. 6, for thrusting this shaft assembly outwardly, so that knob 54, may be operated as a push button for arbitrary control purposes.

The switch mechanism actuated in such push button operation of the knob 54, is shown in Figs. 6, 8, 9 and 10, as a spring pressed contact button 146, positioned in line with the insulating bushing 147, on the inner end of spindle 144, and adapted when pressed inward to bridge contacts 148, 149, to close circuit through the solenoid 122, associated with that particular tuning unit.

An "off" magnet 150, Fig. 3, connected with the lower, "off" bus bar 93 (Fig. 2) furnishes the power to turn the set off when the selector keys 39, in the lower bank are in the "off" position at the time the control circuit is closed at the beginning of a broadcast period. The core 151, of this solenoid is connected to one end of a rocker 152, carrying the mercury switch 153, in the main power circuit.

A reversely acting "on" magnet 154, is provided, having a core 155, connected with the opposite end of rocker 152, and arranged to be energized at the start of a broadcast period when the selector key for that time is in one of the active positions.

The opinion expressing buttons 44, 45, 46, are shown in Fig. 4, as mounted on spring projected slides 156, 157, 158, the first carrying a contact 159, Fig. 19, to bridge the terminals 160, for closing a "good" recording circuit, the second carrying contact 161, for bridging the terminals 162, of a "fair" recording circuit and the third carrying contact 163, for bridging terminals 164, of a "poor" recording circuit.

These opinion registering slides are interlocked so that only one can be operated at a time, the interlocking means consisting of a bar 165, extending transversely across the three slides and having pins 166, 167, in reversely inclined slots 168, 169, in the upper and lower slides and a second transversely disposed bar 170, carrying a pin 171, in the inclined cam slot 172, in the intermediate slide 157, these two bars being carried respectively by the parallel links 173, 173 and 174, 174, pivoted at 175 and yieldingly held centered in the neutral position shown in Fig. 4 by the spring strip 176 engaging the ends of the pivoted parallel links. The bar 165 is raised by engagement of the incline 168 with pin 166 when the top button is pressed, to carry the locking lug 177 thereon into holding engagement in the notch 178 in the lower edge of the middle slide 157 and lug 178a into notch 178b in the lower edge of the lower slide, thus to lock the middle and lower slides. Operation of the intermediate or "fair" button causes cam slot 172 through engagement with pin 171 to raise bar 170 and carry the lugs 179 and 179a into engagement with notches 180, 180a in the upper and lower slides, thus to lock both the latter. Operation of the lower slide 158, through cam slot 169 and pin 167 lowers the locking bar 165 to carry lug 183 into engagement with notch 184 in the upper edge of the upper slide and lug 185 into notch 186 in the upper edge of the intermediate slide, thus to then lock the upper and intermediate slides.

The "yes" and "no" voting buttons on slides 187, 188, carry contacts 189, 190, to bridge the terminals 191, 192, of the "yes" and "no" recording circuits and these slides are interlocked so that only one or the other can be operated during any one broadcast period. The interlock is shown as consisting of a triangular plate 193, pivoted at 194, and having lugs 195, 196, operating in notches 197, 198, in the respective slides, said plate being centered by spring 199, and a spring pressed latch 200, being pivoted at 201, to snap into locking engagement into one or the other of the recesses 202, 203, in the slide 187.

When the upper, "yes" button 47, is pressed, the latch 200, will snap into the locking recess 202, and in such operation, the toggle plate 193, will project the "no" button. Conversely when the "no" button is operated, the toggle plate will project the "yes" button slide and in that event, the locking recess 203, will be caught and held by the latch 200.

The voting buttons 47, 48, remain locked for the balance of the period in which one or the other has been operated, but are automatically released at the end of that period and the commencement of the next period by the so-called "15-minute" magnet 204, Figs. 3 and 4, which receives an impulse from the closing of the time control circuit and has a core 205, connected at 206, with the spring latch 200.

The registering or recording is effected in the present disclosure on a record strip 207, Figs. 2 and 26, driven in synchronism with the time gear train and perforated by discharges from electrodes connected in the opinion registering circuits and distinguishably located in respect to said travelling record strip.

In the illustration, the strip or tape is unwound from one spool 208, onto another spool or sprocket 209, passing over an idler or electrode roll 210, beneath the various electrodes 211, for the various recording circuits. The tape may be printed to make it directly readable for time, stations and expressed opinions, or it may be unprinted and simply run through a decoding machine after the manner disclosed in companion patent application, Ser. No. 423,129.

The synchronous drive of the record strip is effected in the illustration by a gear 212, Fig. 2, on the twenty-four hour shaft 108, operating a gear 213, on rearwardly extending shaft 214, carrying a gear 215, in mesh with gear 216, on the take-up sprocket shaft 217. The recording mechanism as indicated in this view may be a separate unit which can be readily applied to and detached from the main machine.

The various parts are compactly grouped, so as to leave ample space in the casing for radio tubes, speaker unit and other parts and connections. These may vary widely for the different kinds of circuits which may be employed and hence are not here illustrated.

The simplified wiring diagram, Fig. 26, is readable from the foregoing. An "off" switch is indicated at 218, Figs. 1 and 26, for control of the power transformer 219 supplying current to the magnets and other portions of the apparatus. This switch, however, it will be observed, does not affect the clock circuit. Thus at any time the unit may be turned off and rendered inoperative without throwing the clock out of time and then whenever desired, the unit can be cut back into service by simply closing switch 218. A condenser is indicated at 220, for preventing sparking across the breaker points 115, 116, of the timer and this same condenser may be connected as indicated at 221, to furnish the discharge energy for making the recording perforations in the record strip. When the "off" magnet 150, is energized, the mercury switch 153, will be rocked to open the circuit 222, for primary 223, of the power transformer, 219, also without affecting connections 224, to the clock motor or the transformer 225, supplying energy through connections 226 and 227 to the timer, the distributor or the circuit closer and other magnets and manual control buttons 54. The push buttons 54 and back connections 227, 228, for the circuit closer magnets provide actuating connections which bridge about the connections normally provided by the distributor and time contacts, thus to enable closing of such circuits whenever desired regardless of the time.

The same arbitrary control of the circuits normally governed by the "A," "B," "C," "D" keys 40 of the upper bank is provided in the illustration by the switch buttons indicated at 229 in Figs. 1 and 26.

To provide markings which will indicate the beginning and ending of a full day's record, the 3 a. m. and 4 a. m. contacts 230, 231 of the distributor are shown connected by wiring 232, 233 across the "yes" and "no" button circuits. Thus at the end of each twenty-four hour interval, the record strip will carry a "yes" and then a "no" marking, these providing gages by which the record strip can be properly placed in a decoding machine.

The magnets may be compactly arranged in two tiers, as indicated in Figs. 2, 3 and 4, and all enclosed in a single casing made up of complemental halves 234, 235, and which for shielding purposes may be of metallic material. The momentary circuit closing operation of the star wheel timer is advantageous in that the power circuit for operating the magnets is on only for sufficient time to effect immediate operation of the magnets. And the leaving of this circuit open keeps the push button controls 54, always in condition to effect the closing of the circuit through any one of the selectors. The "on" magnet 154, being in series with the selector magnets 122, automatically comes into operation each time one of the selector circuits is closed, whether automatically or manually. The electrodes 211, may lightly engage the surface of the tape riding over the roll 210, so as to insure proper discharge through the tape to form the indicating markings.

In the position of parts illustrated in Fig. 26, the distributor brush 106 has reached the "12 noon" position thereby establishing connection between the current supply ring 111 and the 12 noon contact 103. Assuming switch 218 closed and the 12 noon key lever in the "No. 1 station" position, current will flow through wire 236 and wire 237 to the No. 1 magnet 122 and wire 238 to the "on" magnet 154 and wire 239 to one side of the transformer secondary 240 and from the other side of that secondary across contacts 114, 115, 116 of the rotary timer and by wiring 226 to the current supply ring 111. The No. 1 magnet thereby energized will close circuits, as before described, necessary to bring in the No. 1 station. At such time also the "15 minute" magnet 204 is energized to release the voting buttons, this magnet being connected in parallel relation with magnets 122 and 154 by the wiring 239, 241, 226. In the present disclosure the keys 40 in the upper bank are used to select different wave bands and the keys 39 in the lower bank to select stations in those wave bands or to turn the set off at predetermined times. In the illustration, Fig. 2, the handle 57 of one of the upper keys has been turned down to the lower, "A" position of Fig. 1, causing lug 59 of that key to close switch contact 81 against contact lug 87 of the time representing contact segment 67 and the handle 57 of a lower switch key 39 is standing in the upper, "off" position with the lug 59 of that key holding switch contact 83 in engagement with the contact lug 75 of contact segment 67, substantially as shown at the right in Fig. 3. This would mean that the "off" magnet 150, Figs. 3 and 26, would be energized at the time represented by this particular contact segment 67 to open switch 153 and prevent operation of the set at such time. The "A" position of the wave band selecting keys, as above pointed out, might be for broadcast, short wave, frequency modulation, television or the like, which would mean that in this particular example the stations, say in the broadcast (A) band, would be "off." The setting of the keys 40 to other wave band positions and the keys 39 to different station selecting positions would assure that some station selected in one of the four wave bands indicated would, in that instance, come on at that time represented by this particular time contact 67.

What is claimed is:

1. Program preselecting and control apparatus comprising a bank of contacts arranged each to represent a particular time, time control means for successively connecting said time representing contacts in circuit, a set of function selecting keys movable to different function selecting positions and cooperable each with a particular one of said time representing contacts and a second set of different function selecting keys movable to different function selecting positions and cooperable each with a particular one of said time representing contacts and whereby the function selection for a particular time may be predetermined by the setting of a function selecting key in either one of said two sets of function selecting keys.

2. Program preselecting and control apparatus comprising a bank of contacts arranged each to represent a particular time, time control means for successively connecting said time representing contacts in circuit, a set of function selecting keys rotatably mounted each over one portion of a particular time representing contact and in cooperative relation with that contact, and a second set of different function selecting keys rotatably mounted each over a different portion of a particular time representing contact, in cooperative relation therewith, and whereby the function selected for the time represented by any one of said time contacts may be predetermined by the rotative setting of one of the two function selecting keys cooperatively related to that particular time representing contact.

3. Program preselecting and control apparatus comprising a bank of contacts arranged each contact to represent a particular time, time control means for successively connecting said time representing contacts in circuit, a selecting key associated with each of said contacts and movable in relation thereto to different station selecting and "off" positions, cooperative switch contacts for said different station and "off" positions of said keys, different station selecting magnets and an "off" magnet connected with the respective station selecting and "off" switch contacts and radio station receiving and cut-off means controlled by said different station selecting and "off" magnets, respectively.

4. Program preselecting and control apparatus comprising a bank of contacts arranged each to represent a particular time, time control means for successively energizing said contacts, control units for accomplishing the tuning in of different radio stations and volume control of the reception therefrom and including in each instance adjustable means for accomplishing tuning in a desired station, adjustable means for effecting volume control reception of that station, a magnet for automatically controlling said unit for station tuning and volume control purposes and means enabling manual operation of said unit for station tuning and volume control purposes at any time independent of automatic operation, keys cooperative with said time representing contacts and each movable to different positions for accomplishing automatic operation of the magnets for said different control units and in addition to an "off" position, an "off" magnet for shutting off the apparatus at selected times and switching means associated with said time representing contacts, operable by the keys for those contacts and connected with said control unit magnets and said "off" magnet and whereby said apparatus may be set up to automatically bring in any one of several different stations at desired volume control for that station or to shut off all stations, at different desired preselected times, or be manually arbitrarily operated at any time to bring in any one of said several stations at desired sound level or to shut off all stations.

5. Program preselecting and control apparatus comprising a bank of contacts arranged each to represent a particular time, time control means for successively energizing said contacts, switching means associated with each of said time representing contacts for effecting wave band selection, switching means associated with each of said time representing contacts for effecting selection of stations in different wave bands, keys cooperative with said wave band selective switch means and shiftable into different wave band selecting positions and keys associated with said station selecting switch means and shiftable into different station selecting positions, there being one of said wave band selecting keys and one of said station selecting keys for each of said time representing contacts and whereby a particular station in a particular wave band for a desired time may be selected through the medium of the two keys associated with the contact representing that particular time.

6. Program preselecting and control apparatus comprising a bank of contacts arranged each to represent a particular time, time control means for successively energizing said contacts, switching means associated with each of said time representing contacts for effecting wave band selection, switching means associated with each of said time representing contacts for effecting selection of stations in different wave bands, keys cooperative with said wave band selective switch means and shiftable into different wave band selecting positions and keys associated with said station selecting switch means and shiftable into different station selecting positions, there being one of said wave band selecting keys and one of said station selecting keys for each of said time representing contacts and whereby a particular station in a particular wave band for a desired time may be selected through the medium of the two keys associated with the contact representing that particular time, one of the keys of each of said time representing contacts having a further "off" position and means controlled by said key in said "off" position for rendering the apparatus inoperative at the time represented by that particular time contact.

FREEMAN H. OWENS.